United States Patent [19]

Fournier, Jr. et al.

[11] Patent Number: 4,969,714
[45] Date of Patent: Nov. 13, 1990

[54] HELMET MOUNTED DISPLAY HAVING DUAL INTERCHANGEABLE OPTICAL EYEPIECES

[75] Inventors: Joseph T. Fournier, Jr., Glastonbury; Stephen J. Smith, Simsbury, both of Conn.; Harvey A. Smith, Hampden; Harry R. McKinley, Southhampton, both of Mass.; William E. McLean, Aberdeen, Md.

[73] Assignee: United Technologies Corporation, Hartford, Conn.

[21] Appl. No.: 313,685

[22] Filed: Feb. 21, 1989

[51] Int. Cl.$^5$ .................... G02B 27/14; G02B 23/12
[52] U.S. Cl. .................... 353/174; 350/538; 350/545; 340/705
[58] Field of Search ............ 350/171, 174, 538, 545, 350/569; 340/705; 250/330, 213 R

[56] References Cited

U.S. PATENT DOCUMENTS

| | | | |
|---|---|---|---|
| Re. 27,356 | 5/1972 | LaRussa | 350/157 |
| 3,059,519 | 10/1962 | Stanton | 88/1 |
| 3,614,314 | 10/1971 | Rossier | 178/7.88 |
| 3,870,405 | 3/1975 | Hedges | 350/294 |
| 3,923,370 | 12/1975 | Mostrom | 350/55 |
| 4,028,725 | 6/1977 | Lewis | 358/103 |
| 4,153,913 | 5/1979 | Swift | 358/93 |
| 4,218,111 | 8/1980 | Withrington et al. | 350/3.72 |
| 4,225,215 | 9/1989 | Cojan | 350/174 |
| 4,361,384 | 11/1982 | Bosserman | 350/174 |
| 4,508,424 | 4/1985 | Ruder | 350/174 |
| 4,660,943 | 4/1987 | Ellis | 350/538 |
| 4,669,810 | 6/1987 | Wood | 350/3.7 |
| 4,755,664 | 7/1988 | Holmes et al. | 250/213 |
| 4,761,056 | 8/1988 | Evans et al. | 350/174 |
| 4,763,990 | 8/1988 | Wood | 350/320 |
| 4,775,217 | 10/1988 | Ellis | 350/538 |

FOREIGN PATENT DOCUMENTS 0206324 12/1986 European Pat. Off. ............ 340/705

OTHER PUBLICATIONS

Martin Shenker, *Optical Design Criteria for Binocular Helmet-Mounted Displays* SPIE vol. 778 Display System Optics (1987), pp. 70–77.

E. Lewis and B. Amos, *A High Resolution Vision System for Aircraft and Trainers*, NAECON '76 RECORD, pp. 894–902.

Richard A. Buchroeder, *Helmet-Mounted Displays*, SPIE's 1987 Technical Symposium Southeast on Optics, Electro-Optics, and Senor, May 21, 1987.

*Primary Examiner*—Bruce Y. Arnold
*Assistant Examiner*—Ronald M. Kachmarik
*Attorney, Agent, or Firm*—Richard H. Kosakowski

[57] ABSTRACT

Helmet mounted display apparatus for use in aircraft and rotorcraft includes an image source for generating images that are projected into the pilot's forward field of view by a portion of relay optics that are common to both day and night viewing and interchangeable optical eyepieces, one for daytime viewing and one for nighttime viewing.

39 Claims, 5 Drawing Sheets

HELMET MOUNTED DISPLAY HAVING DUAL INTERCHANGEABLE OPTICAL EYEPIECES

This invention was made with Government support under a contract awarded by the Department of the Army. The Government has certain rights in this invention.

TECHNICAL FIELD

This invention relates to helmet mounted displays, and more particularly to a helmet mounted display having dual interchangeable optical eyepieces.

BACKGROUND ART

The use of helmet mounted displays (HMDs) in modern high-performance aircraft and rotorcraft is well known. The increasing complexity of these crafts has led to an increased burden on the pilot to visually interpret flight data from a large number of sources. The HMD helps to alleviate this burden by providing in the pilot's forward field of view a display of information essential for the pilot's performance of such tasks as target acquisition and weapon delivery. The HMD allows him to spend more time piloting the craft in a head-up mode, i.e., looking out at the exterior scene and not looking down as often at the instrument panel.

The information displayed by the HMD typically consists of symbols relating to pilotage and weapon targeting. This symbol information is fed by the onboard flight computer to a cathode ray tube (CRT) image source. The CRT image is then projected through a series of optical components, typically including partially reflective/ partially transmissive optical components located in front of the pilot's eyes. Viewing through the partially transparent components, sometimes referred to as a "combiner", the pilot is presented with a virtual image of the CRT image projected in his view of the external "real world" scene.

Depending on the ambient light conditions in which the pilot is flying, different requirements are placed on the optical design of the HMD. For the relatively high brightness daytime light (as compared to nighttime light), the combiner must have high transparency (see-through) since the pilot views the external scene as well as the projected symbol information. Consequently, the display source must have high brightness (e.g., a CRT written in the stroke mode) so as to produce enough contrast in the projected symbols.

For nighttime conditions, when flying by the "naked eye" is dangerous or impossible, night vision aids are required. In the present art, pilots utilize Image Intensifier devices employed in Night Vision Goggles (NVGs). An advantage of the HMD is that the nighttime viewing function can be accomplished with the HMD optical system. For such use, the external scene may be sensed by, for example, image intensified television of forward looking infrared devices. The output of these devices is electronically processed and fed to an image projection source such as a raster mode CRT. The processing may also include the addition of symbol data to the sensed image of the exterior scene. The resulting CRT image is projected in the pilot's forward field of view through the HMD projection optical components.

The raster mode CRT images are typically much lower in luminance than the visual symbol information produced by the stroke written CRT for the daytime situation. (Typical stroke written luminances can be 100 times as bright as typical raster mode luminances.) Thus, the highly transmissive, only partially reflective combiner used in a HMD designed for day usage is necessarily inefficient in transferring light from the CRT to the eye. (For some typical combiner designs, brightness transfer from the CRT to the eye can be less than ten percent). Consequently, the high see-through viewing optics commonly used in prior art HMD designs are not optimally suited for night flying conditions.

Another approach to night vision capability involves the direct incorporation on the helmet of image intensifier devices directly coupled to the HMD optics. Such apparatus is disclosed and claimed in a copending U.S. patent application of the same assignee entitled: DIRECT INCORPORATION OF NIGHT VISION IN A HELMET MOUNTED DISPLAY, U.S. Pat. application Ser. No. 313,686 filed on even date herewith by Fournier et al. There, the brightness levels provided by the image intensifiers are on the order of 1% or less of the typical CRT raster brightness, and the brightness transmitted to the eye from the high see-through viewing optics can be inadequate for normal vision, much less for piloting an aircraft.

The HMD prior art attempts to solve the luminance transfer problem by using a refractive relay system which uses only a single combiner (e.g., the IHADSS HMD from Honeywell). However, these HMDs introduce other problems, e.g., the diameters of the relay lenses tend to be large, and the eye relief (i.e., the distance from the observer's eye to the nearest HMD optical component) tends to be short. These dimensions are undesirable when attempting to design an HMD to meet the geometries imposed on the HMD by the human head.

Two completely different optical systems can be used to meet the requirements of both day and night viewing but this requires considerable extra hardware which is both costly and difficult to stow in the aircraft. It also raises some concerns about the changeover from one HMD to another when transitioning from daylight to nighttime. For example, when the pilot is on a mission that begins during daylight and runs through dusk into night, the pilot must replace the entire day HMD with the entire nighttime HMD. This changeover may occur at a critical time and may be so cumbersome as to require the pilot to land the aircraft to accomplish the changeover.

DISCLOSURE OF INVENTION

An object of the invention is to provide a HMD comprising an arrangement of helmet mounted image projection optical components common for both daytime and nighttime use and a pair of interchangeable eyepieces, a first eyepiece optimized for daytime light conditions, the day eyepiece having high see-through transmission and intended primarily for viewing high luminance stroke written data projected in the external daytime scene, a second eyepiece optimized for nighttime light conditions, the night eyepiece being opaque and providing for efficient transmission of the light from the image source to the eye, the night eyepiece being intended for use in viewing very low luminance images such as are provided by image intensifiers used in, for example, night vision goggles, whereby it is a simple matter of interchanging between the eyepieces depending on the ambient light conditions.

Other objects of the invention include having the eyepieces and common relay optics provide for control of astigmatism and chromatic and spherical aberrations, and having the overall HMD provide for reduced weight and bulk.

According to the invention, apparatus for displaying an image in the forward field of view of a human eye includes an image source for generating a visual image, and an arrangement of optical components disposed along an optical axis and mounted to a helmet worn by a human, the arrangement having a first portion comprising optical components that are common to both daytime and nighttime use, the arrangement also having a pair of interchangeable eyepiece portions, a first one of the pair comprising optical components optimized for daytime light conditions, a second one of the pair comprising optical components optimized for nighttime use, each one of the pair being disposed, when mounted to the helmet, along the optical axis following the first portion of optical components to present the image to the human forward field of view.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
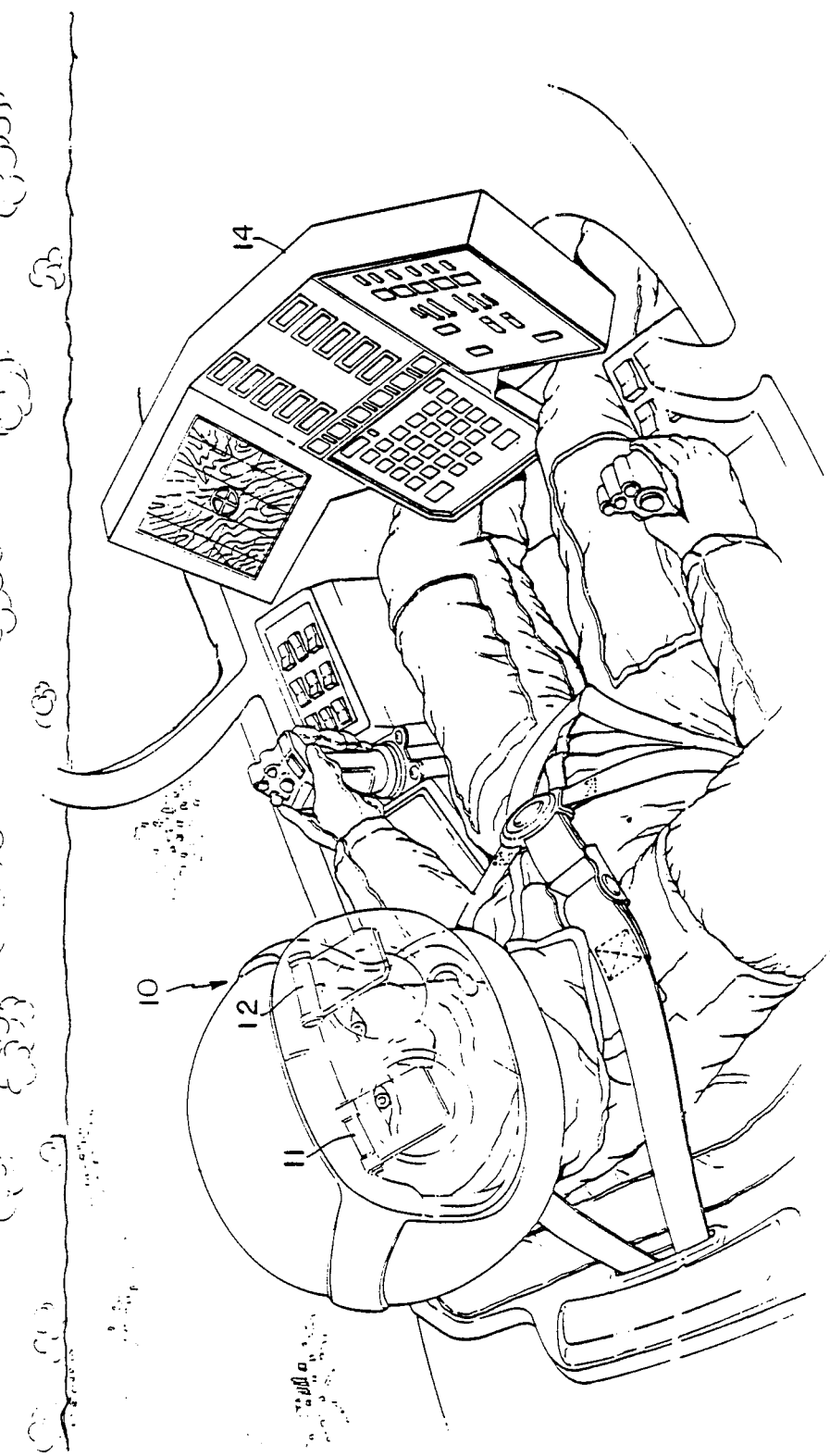
FIG. 1 illustrates a perspective view of a pilot of a modern high-performance aircraft wearing helmet mounted display apparatus typical of that of the prior art.

FIG. 1 illustrates a perspective view of an aviator piloting a modern high-performance aircraft while wearing a helmet mounted display (HMD) 10 typical of that found in the prior art. In the HMD 10, flight information is viewed through partially transparent optical eyepieces 11,12 located along the pilot's forward line of sight The flight information is provided at the image surface of one or more CRTs (not shown) to a series of optical components (not shown) that relay the image to the eyepieces 11,12. The CRTs and projection optics can all be helmet mounted, or some portion of the display components can be located in the cockpit.

The HMD illustrated in FIG. 1 is solely for daytime light conditions. For low luminance nighttime conditions, the pilot desires an intensified image of the exterior scene so as to enable him to pilot the craft to the best of his ability. In this case, the pilot is required to remove the entire daytime HMD and replace it with an entire HMD designed for nighttime light conditions. This changeover can be awkward and dangerous when performed during flight. Thus, in accordance with the present invention, a HMD is provided having helmet mounted projection optics that allow for both daytime and nighttime usage with a reduced amount of necessary HMD component changeover.

Figure 2:
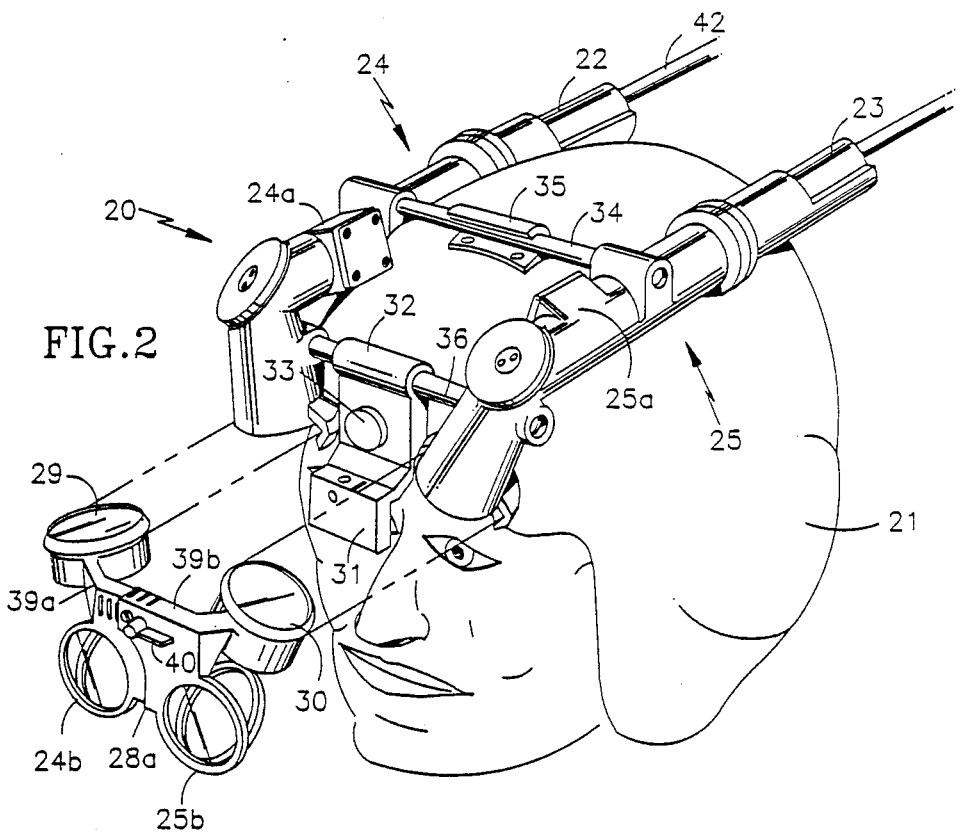
FIG. 2 illustrates a perspective view of HMD apparatus in accordance with the present invention.

FIG. 2 illustrates a perspective view of a preferred embodiment of a HMD 20 in accordance with the present invention. The HMD 20 mounts to the outer surface of a known type aviator's helmet 21, such as the model HGU55 provided by Gentex Corp. of California. The helmet provides an opening in the outer surface in proximity to the facial area. The HMD comprises two CRT image sources 22,23 together with a corresponding pair of identical optical component arrangements 24,25, one for each eye. Each CRT generates images of pilotage symbol information. The optical component arrangement is described in detail hereinafter with respect to the cross-sectional illustration of FIG. 3, and the optical ray diagrams of FIGS. 4,5.

Each arrangement 24,25 comprises, in part, a "relay optic" portion 24a,25a having optical components (not visible) enclosed in aluminum and used in both day and night HMD configurations. Each arrangement also comprises a daytime "eyepiece" portion 24b,25b having optical components optimized for daytime light conditions, and a nighttime eyepiece (not shown) 24c,25c having optical components optimized for nighttime light conditions. The daytime eyepieces 24b,25b mount in a first interchangeable binocular goggle assembly 28a, and the nighttime eyepieces 24c,25c mount in a second interchangeable binocular goggle assembly 28b (not shown). It is to be understood that the goggle assemblies 28a,28b are similar in structure; the difference lies in the optical components comprising the eyepiece portions as described in detail hereinafter with respect to FIGS. 4,5 and Tables I,II. FIG. 2 illustrates the HMD with the goggle assembly 28a separated from the helmet 21.

The goggle assembly mates with each relay optic portion 24a,25a by engagement slides 29,30. A known type, first ball detent 31 holds the goggle assembly to a mounting block 32 on the front of the HMD. The ball detent 31 and engagement slides 29,30 allow the pilot to quickly remove the goggle assembly from the helmet. The front mounting block 32 attaches to the front of the helmet using either a fixed screw mount or a second ball detent 33. A first rod 34 connects the two relay optic portions together. The rod 34 engages a hook 35 on the crown of the helmet. The second ball detent 33 and rod/hook 34/35 permit the pilot to quickly disengage the entire HMD 20 from the helmet 21.

A second rod 36 passes through the front mounting block 32 and connects to the two relay optic portions The first and second rods 34,36 permit the relay optic portions to slide horizontally, thereby allowing the pilot to align the two relay optic portions for his particular eye spacing. This eye spacing is commonly referred to as the interpupillary distance (IPD). The second rod 36 has a knob (not shown) at one end to facilitate the IPD adjustment through a range of 58.9–73.3 mm, which is suitable for a wide range of pilot head sizes.

In order to allow IPD adjustment, the optical components of the eyepieces are mounted in segmented portions 39a,39b of the goggle assembly 28a . The segmented portions 39a,39b slide relative to one another when a retaining screw 40 is loosened. Thus, to adjust the IPD, the pilot loosens the retaining screw 40 and adjusts the knob on the second rod 36 until the IPD is correct for his particular eye spacing. Then the pilot retightens the retaining screw.

Figure 3:
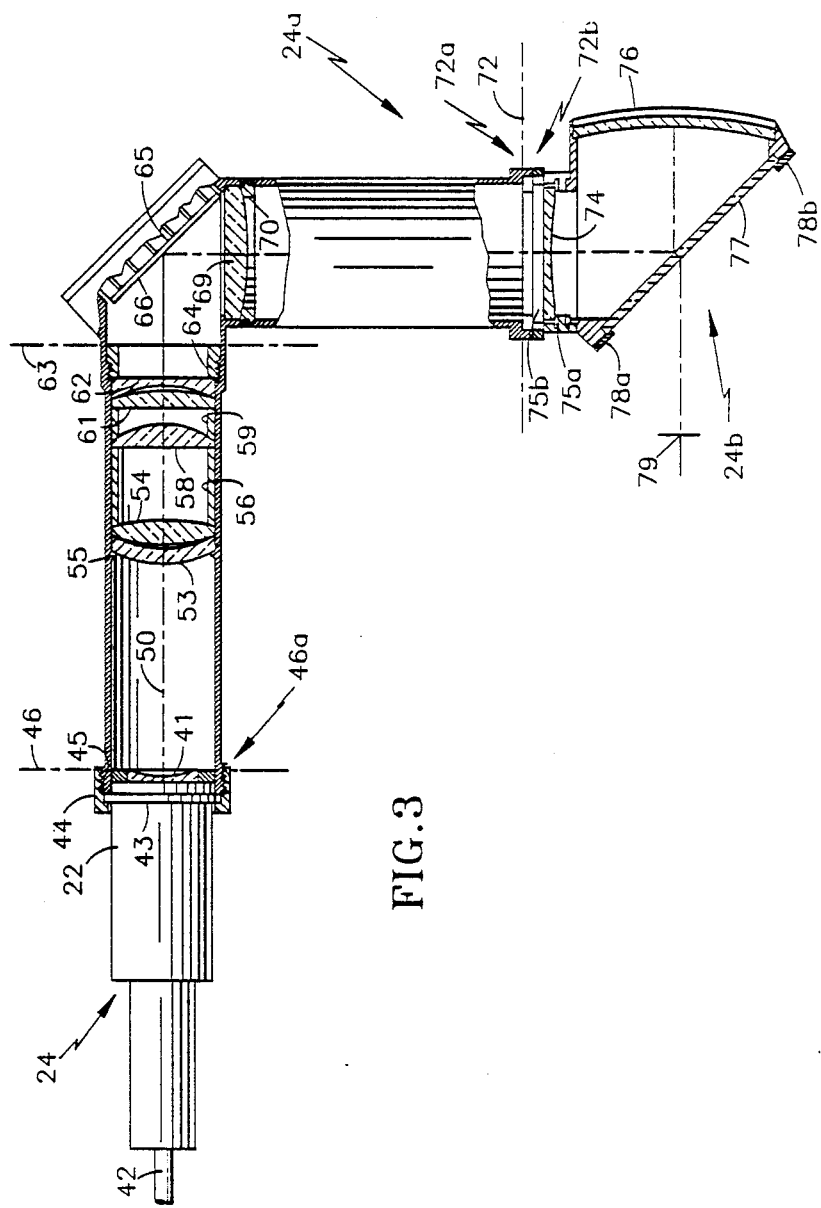
FIG. 3 is a cross sectional view of a portion of the HMD apparatus.

FIG. 3 is a cross-sectional view of either one of the optical component arrangements 24,25. The CRT 22 presents a visual image of flight information on a plano concave fiber optic faceplate 41 that is a part of the CRT. The CRT is typically a Model H-1380, one inch diameter, miniature CRT provided by Hughes Aircraft Company, Industrial Products Division, Carlsbad, California. The CRT drive electronics (not shown) are well known and are located in the aircraft cockpit. The drive electronics can operate the CRT in either the stroke (high brightness) mode and raster mode. The CRT image information is presented to the drive electronics by the on-board flight computer. The drive electronics connect to the CRT by a shielded electrical cable 42. The CRT 22 attaches to the relay optic portion 24a by means of a flange 43 secured with adhesive to the CRT and a nut assembly 44 which mates with threads 45 on the relay optic portion. This attachment point is located at an entrance aperture of the relay optic portion, as illustrated by the split line 46.

Proceeding along an optical axis 50, a pair of glass optical lenses 53,54 are positioned after the CRT faceplate 41. The first lens 53 is positioned with a machined seat 55. The second lens 54 rests against the first lens. A first tubular spacer 56 follows the second lens, followed by a third lens 58, a second tubular spacer 59, and a second pair of lenses 61,62. The two lenses comprising each of the first and second lens pairs are normally positioned next to each other and are made of different types of glass or plastic material so as to reduce chromatic abberrations.

A split line 63 designates a physical break in the relay optic portion; the segment to the left of the split line 63 is either press-fitted or secured with adhesive into the segment to the right of the split line. A lens retaining nut 64 is positioned inside the housing to hold the lenses 53,54,58,61,62 and spacers 56,59 in place.

Attached to a back surface 65 is a fold mirror 66 which is used to direct (fold) the optical axis 50 downward in the relay optic portion. The mirror 66 is attached using conventional optical component mounting techniques known in the art so as to provide a low stress mount. A sixth lens 69 is positioned by a second lens retaining nut 70. The relay optic portion then physically terminates at a split line 72. Below the split line 72 is the daytime eyepiece 24b. The split line can also be considered illustrative of the location of an intermediate image focal plane 72a of the relay optic portion, and of an input aperture 72b of the eyepiece.

Located underneath the split line 72 is a first eyepiece lens 74 positioned against a machined seat 75a with a retaining nut 75b. Also within the eyepiece is a combiner 76 and a beamsplitter 77. The beamsplitter 77 is held in place with clips 78a, 78b. The optical axis is illustrated as terminating at a focal point 79 at the observer's eye (i.e., with an observer wearing the HMD of the present invention). It is to be understood that the optical components comprising the nighttime eyepiece 25c are positioned inside the eyepiece with similar types of machined seats and retainer nuts.

Figure 4:
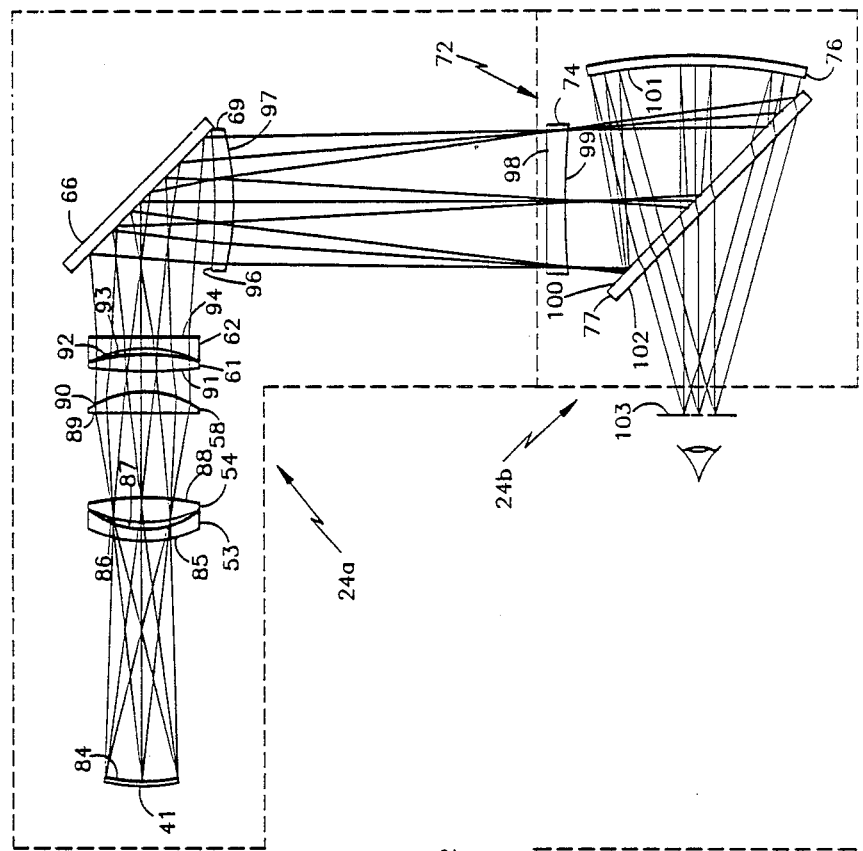
FIG. 4 illustrates an optical ray trace of a preferred embodiment of optical components.

FIG. 4 illustrates an optical ray trace of a preferred embodiment of the optical component arrangement 24,25. The relay optic portion components are above the split line 72, while the daytime eyepiece components are below the split line. Also, surfaces and inter-component spacings of each component are enumerated in FIG. 4.

TABLE I

| Surface No. | Radius (mm) | Curve Type | Thick/ Dist (mm) | Mat'l |
|---|---|---|---|---|
| 84 | 40.000000 | CV | 61.863200 | AIR |
| 85 | 35.488000 | CX | 3.000000 | F4 |
| 86 | 21.770000 | CV | 1.792300 | AIR |
| 87 | 33.991000 | CX | 6.000000 | SIO2 |
| 88 | 85.875000 | CX | 21.905600 | AIR |
| 89 | 201.985000 | CV | 5.500000 | SIO2 |
| 90 | 24.617000 | CX | 5.209200 | AIR |
| 91 | 175.000000 | CX | 4.500000 | SIO2 |
| 92 | 54.941000 | CX | 1.433000 | AIR |
| 93 | 30.044000 | CV | 3.000000 | F4 |
| 94 | 384.855000 | CX | 34.294000 | AIR |
| 95 | — | — | 19.000000 | AIR |
| 96 | 221.803000 | CV | 5.000000 | SIO2 |
| 97 | 74.673000 | CX | 81.356900 | AIR |
| 98 | 2000.000000 | CX | 5.000000 | ACRYL |
| 99 | 221.803000 | CV | 33.643100 | AIR |
| 100 | — | — | 34.801353 | AIR |
| 101 | 128.165000 | CV | 35.941353 | AIR |
| 100 | — | — | 3.000000 | ACRYL |
| 102 | — | — | 51.420000 | AIR |
| 103 | — | — | — | — |

Table I lists the prescription data for the optical components. Listed in order from left to right are (1) the surface number, (2) the radius of curvature in mm, (3) the type of curvature (CV=concave; CX=convex), (4) the distance to the next surface or thickness in mm, and (5) the type of material between the surface and the next surface. The type and radius of curvatures of the optical components is chosen in part to control astigmatism and spherical aberrations.

Thus, referring to FIG. 4 and Table I, the image produced by the CRT is presented on an outer surface 84 of the plano concave (CV) fiber optic faceplate 41 having a radius of curvature of 40 mm. The faceplate is located approximately at the entrance aperture 46 of the relay optic portion. The optical rays then travel through air a distance of 61.8632 mm to a first surface 85 of the first glass lens 53. All distances listed in Table I are measured from the centers of each component. The first surface 85 of the first lens has a convex shape and a radius of curvature of 35.488 mm. Also, the lens is 3.0 mm thick and is made of F4 glass. The physical characteristics and spatial disposition of the remaining optical components are determined from FIG. 4 and Table I in a similar manner.

It is to be noted that surface 95 is that of the fold mirror, whose surface comprises an aluminized reflective coating. Also, surface 100 is listed twice in Table I in accord with the path taken by the light which is first reflected from partially reflective surface 100 to surface 101, then reflected from partially reflective surface 101 back toward the eye, passing through the beamsplitter defined by surfaces 100 and 102. The first listing indicates a 34.801353 mm ray travel distance to surface 101, whereas the second listing indicates a beamsplitter thickness of 3 mm. Also, surface 103 indicates the exit pupil of the optical rays. The exit pupil is approximately 8 mm in diameter.

The relay optics are designed to produce a focused CRT image at the point in the optical path in proximity to the intermediate image focal plane 72a. The focused image has a magnification range of 0.5–4 of the image at the CRT faceplate 41. The focused image at the focal plane 72a is at a distance of 100–400 mm (i.e., the focal length of the relay optics) along the optical path 50 from the faceplate.

The daytime eyepiece essentially creates a virtual image, in the observer's forward field of view, of the focused image at the focal plane. This virtual image is focused at a distance from the observer's eye of from one meter to infinity, which results in the image appearing in focus to the eye of the observer. Thus, the observer does not have to refocus his eyes to view the image generated by the CRT that is superimposed on the observer's view of the external terrain. The virtual image of the occupies a portion of the observer's visual field having a minimum subtense at the eye of ten (10) degrees. The focal length of the eyepiece is approximately 100 mm, resulting in an overall optical path length from the faceplate to the eye of 200–400 mm.

The CRT faceplate is shown with 19 mm diameter which is the active image area of the miniature CRT. The lens diameters are chosen to contain the rays with margin to permit retention in the relay optic portions. The lenses comprising the relay optic portion are all glass; either F4 or fused silica (SI02). The eyepiece components are all acrylic plastic. Plastic elements were chosen for weight and safety reasons. However, it is to be understood that the eyepiece lenses can be glass without detracting from the scope of the present invention.

All components other than the folding mirror 66 have a known antireflective coating. In addition, the coatings on the surface 101 of the combiner 76 and the surface 100 of the beamsplitter 77 are adjusted for a reflectivity of 20%–60% (40% preferred) for visible light in the wavelength range of 400–700 nanometers. The resulting partial transmissivity of the beamsplitter and combiner allow the observer to view external scenes disposed beyond the daytime eyepiece The day eyepiece can be termed to be catadioptric due to the use of partially transmissive/ partially reflective optical components. Each optical component in FIG. 4 can be built from the prescription data of Table I using known techniques.

Figure 5:
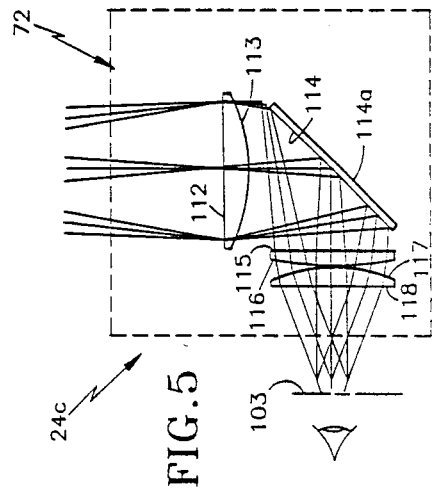
FIG. 5 illustrates a second optical ray trace of a preferred embodiment of optical components.

FIG. 5 illustrates an optical ray trace of the optical components comprising the nighttime eyepiece 24c. Table II lists the corresponding prescription data. Since the relay optic portion components are similar as those of FIG. 4, the entries in Table II for surfaces 84-96 are similar to those in Table I. Note that surface 114 of component 114a is an aluminized reflective surface which totally reflects the optical rays and blocks transmission of optical rays of the external scene disposed beyond the night eyepiece. Thus, component 114a is essentially opaque. Also, the image projected into the observer's forward field of view occupies an angle in the observer's visual field having a minimum subtense of twenty (20) degrees.

TABLE II

| Surface No. | Radius (mm) | Curve Type | Thick/ Dist (mm) | Mat'l |
|---|---|---|---|---|
| 84 | 40.000000 | CV | 61.863200 | AIR |
| 85 | 35.488000 | CX | 3.000000 | F4 |
| 86 | 21.770000 | CV | 1.792300 | AIR |
| 87 | 33.991000 | CX | 6.000000 | SIO2 |
| 88 | 85.875000 | CX | 21.905600 | AIR |
| 89 | 201.985000 | CV | 5.500000 | SIO2 |
| 90 | 24.617000 | CX | 5.209200 | AIR |
| 91 | 175.000000 | CX | 4.500000 | SIO2 |
| 92 | 54.941000 | CX | 1.433000 | AIR |
| 93 | 30.044000 | CV | 3.000000 | F4 |
| 94 | 384.855000 | CX | 34.294000 | AIR |
| 95 | — | — | 19.000000 | AIR |

TABLE II-continued

| Surface No. | Radius (mm) | Curve Type | Thick/ Dist (mm) | Mat'l |
|---|---|---|---|---|
| 96 | 221.803000 | CV | 5.000000 | SIO2 |
| 97 | 74.673000 | CX | 93.000000 | AIR |
| 112 | 1863.457201 | CX | 7.000000 | ACRYL |
| 113 | 39.515000 | CX | 21.000000 | AIR |
| 114 | — | — | 20.500000 | AIR |
| 115 | — | — | 4.000000 | ACRYL |
| 116 | 83.478000 | CX | 0.500000 | AIR |
| 117 | 39.515000 | CX | 4.500000 | ACRYL |
| 118 | — | — | 25.000000 | AIR |
| 103 | — | — | — | — |

Figure 7:
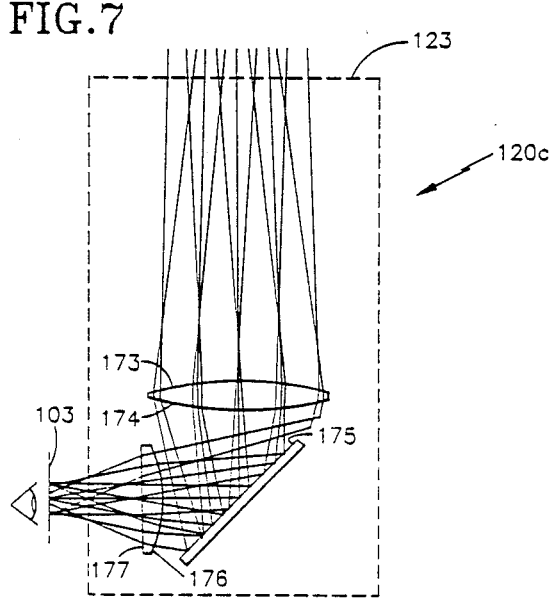
FIG. 7 illustrates a second optical ray trace of an alternative embodiment of optical components.
Figure 6:
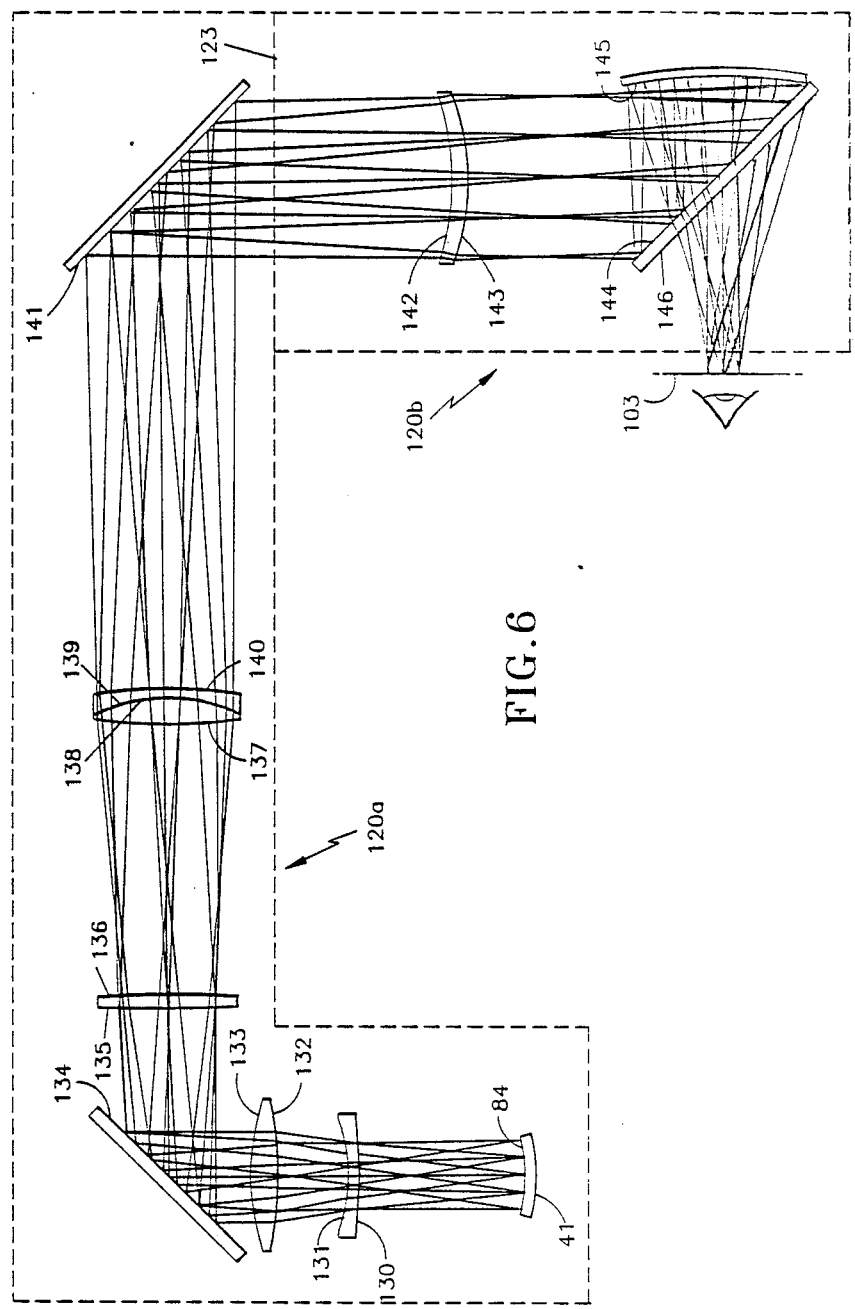
FIG. 6 illustrates an optical ray trace of an alternative embodiment of optical components.

FIG. 6 illustrates an optical ray trace of an alternative embodiment of a relay optical portion 120a and a daytime eyepiece 120b, separated at a split line 123. Table III list the corresponding prescription data. FIG. 7 illustrates the alternative embodiment nighttime eyepiece 120c. Table IV list the corresponding prescription data. The alternative embodiments are comprised entirely of conventional plastic optical elements. It should be noted that the alternative embodiments illustrated have a longer optical path length than the preferred embodiments of FIGS. 4,5. This requires the CRTs 22, 23 and a portion of the relay optic components to be mounted on the back side of the helmet 21 for best fit to the outer surface of the helmet.

TABLE III

| Surface No. | Radius (mm) | Curve Type | Thick/ Dist (mm) | Mat'l |
|---|---|---|---|---|
| 84 | 40.000000 | CV | 42.360000 | AIR |
| 130 | 149.880000 | CX | 3.000000 | POLYC |
| 131 | 53.660000 | CV | 18.418400 | AIR |
| 132 | 110.449000 | CX | 7.000000 | ACRYL |
| 133 | 57.279000 | CX | 21.000000 | AIR |
| 134 | — | — | 43.000000 | AIR |
| 135 | 316.793000 | CX | 4.000000 | ACRYL |
| 136 | 316.793000 | CX | 69.000000 | AIR |
| 137 | 163.725000 | CX | 7.000000 | ACRYL |
| 138 | 42.692000 | CX | 0.000000 | AIR |
| 139 | 42.692000 | CV | 2.000000 | POLYC |
| 140 | 135.158000 | CX | 130.000000 | AIR |
| 141 | — | — | 76.000000 | AIR |
| 142 | 65.596000 | CV | 4.200000 | ACRYL |
| 143 | 55.139000 | CX | 64.000000 | AIR |
| 144 | — | — | 25.300000 | AIR |
| 145 | 135.158000 | CV | 26.500000 | AIR |
| 144 | — | — | 3.000000 | ACRYL |
| 146 | — | — | 47.000000 | AIR |
| 103 | — | — | — | — |

TABLE IV

| Surface No. | Radius (mm) | Curve Type | Thick/ Dist (mm) | Mat'l |
|---|---|---|---|---|
| 84 | 40.000000 | CV | 42.360000 | AIR |
| 130 | 149.880000 | CX | 3.000000 | POLYC |
| 131 | 53.660000 | CV | 18.418400 | AIR |
| 132 | 110.449000 | CX | 7.000000 | ACRYL |
| 133 | 57.279000 | CX | 21.000000 | AIR |
| 134 | — | — | 43.000000 | AIR |
| 135 | 316.793000 | CX | 4.000000 | ACRYL |
| 136 | 316.793000 | CX | 69.000000 | AIR |
| 137 | 163.725000 | CX | 7.000000 | ACRYL |
| 138 | 42.692000 | CX | 0.000000 | AIR |
| 139 | 42.692000 | CV | 2.000000 | POLYC |
| 140 | 135.158000 | CX | 130.000000 | AIR |
| 141 | — | — | 114.000000 | AIR |
| 173 | 84.312000 | CX | 8.000000 | POLYC |
| 174 | 84.312000 | CX | 23.000000 | AIR |
| 175 | — | — | 21.000000 | AIR |
| 176 | 34.836000 | CX | 5.000000 | ACRYL |
| 177 | — | — | 24.000000 | AIR |

TABLE IV-continued

| Surface No. | Radius (mm) | Curve Type | Thick/ Dist (mm) | Mat'l |
|---|---|---|---|---|
| 103 | — | — | — | — |

The preferred embodiment of the daytime optical components provide for data display in a 30-35 degree monocular field of view with 36% see-through luminance transfer from the CRT (60% beamsplitter transmission, 60% combiner transmission). The nighttime optical components provide for approximately 40 degree monocular field of view with no combiner see-through. THe HMD is designed for binocular viewing using two eyepieces with 100% overlap of the left and right visual fields. Also, the optics are designed to accomodate a CRT image source having an active image diameter in the range of 16-25 mm, with the projection optical lenses having an effective focal length in the range of 15-55 mm.

It will be appreciated by those skilled in the art of optical design that it is a significant design task to develop an HMD optical system that produces an image of quality suitable for pilotage while incorporating interchangeable eyepieces having such different optical characteristics as the day and night eyepieces herein disclosed. Considering the optics of a particular configuration (i.e., the common relay optics together with either the day eyepiece or night eyepiece), the day and night optics have substantially different effective focal lengths, and the Petzval surfaces differ substantially. That is, the day and night optics ideally would have an image input surface (the CRT faceplate) of substantially different curvature. Also, simultaneous control of various aberrations is a difficult task.

As disclosed, a CRT is used as the image source; however, other image sources could be used. A CRT was chosen because of size, weight, cost, resolution, and brightness considerations. Also, as illustrated, the CRT is mounted on the helmet. However, the image source can be mounted off the helmet and not detract from the scope of the present invention. In this case, the image would then be presented to the helmet mounted projection optics by a flexible fiber optic cable.

As illustrated, the daytime and nighttime eyepieces are comprised of plastic optical elements. Plastic was chosen for weight and safety reasons. However, these components can be made of a suitable light weight glass; the choice of material is not critical to the practice of the present invention. Also, the eyepieces are disclosed as being housed together on sliding segments in an interchangeable goggle assembly. However, each eyepiece can be mounted individually to the corresponding relay optic portion in a suitable interchangeable structure. By retaining the connection (in the form of the two mounting rods) between the two housing portions, the desired binocular unit with IPD adjustment can be achieved. However, by removing the connection between the housing portions, a monocular HMD may be obtained by mounting only one arrangement 24 to the helmet 21. The resulting monocular HMD arrangement is within the scope of the present invention.

The material enclosing the relay optic portion illustrated in FIG. 3 is aluminum. However, a molded plastic or other suitable material that provides structural integrity consistent with low weight may be utilized. The choice of material itself forms no part of the present invention.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Helmet mounted display apparatus, comprising:
   a helmet, adapted to be worn by an observer, having an outer surface with an opening provided in proximity to the eyes of the observer;
   an image source disposed on said helmet outer surface for providing images of varying luminance;
   relay optic means, comprising a plurality of optical components and being disposed on said helmet outer surface, for receiving said images at an entrance pupil thereof and for guiding the images along an optical path to an intermediate image focal plane located in proximity to said outer surface opening, the images in proximity to said focal plane being in the form of the images as focused at said entrance pupil, the focused images in proximity to said focal plane being a magnification of the images at said entrance pupil, said relay optic means being adapted to engage an eyepiece; and
   a pair of separate interchangeable eyepiece means, each of said eyepiece means having one or more optical components and being adapted to releasably engage said relay optic means, each of said eyepiece means comprising means, when engaged, for receiving the images at an input aperture thereof and for presenting, in the observer's forward field of view, the images as focused on the optical path in proximity to said focal plane.

2. The helmet mounted apparatus of claim 1, wherein said one or more optical components of a first one of said pair of separate interchangeable eyepiece means are catadioptric.

3. The helmet mounted apparatus of claim 2, wherein said catadioptric optical components include a beamsplitter component and a combiner component, said beamsplitter component and said combiner component each having the optical characteristics of partial transmission and partial reflection, said beamsplitter component disposed in the observer's forward field of view nearest to the observer to project the images at said input aperture into the observer's forward field of view, said combiner disposed to simultaneously transmit, into the observer's forward field of view, the scenic image disposed in the observer's forward field of view beyond said combiner and to reflect the images projected by said beamsplitter component into the observer's forward field of view.

4. The helmet mounted apparatus of claim 3, wherein a surface of said beamsplitter component farthest from the observer is coated with a partially reflective, partially transmissive optical coating having optical reflectivity in the range of twenty to sixty percent.

5. The helmet mounted apparatus of claim 3, wherein a surface of said combiner component nearest to the observer is coated with a partially reflective, partially transmissive optical coating having optical reflectivity in the range of twenty to sixty percent.

6. The helmet mounted apparatus of claim 3, wherein said beamsplitter component and said combiner component are each comprised of a light weight plastic material.

7. The helmet mounted apparatus of claim 1, wherein a second one of said pair of separate interchangeable eyepiece means includes an optical reflecting component disposed in the observer's forward field of view to reflect the focused images at said input aperture into the observer's forward field of view, said reflecting component being opaque to optical signals representing the external scene disposed in the observer's forward field of view beyond said reflecting component.

8. The helmet mounted apparatus of claim 1, wherein said relay optic optical components includes a plurality of lenses of different material composition disposed in proximity to one another, whereby each of said plurality of lenses reduces chromatic abberrations of the images that are guided through said lenses.

9. The helmet mounted apparatus of claim 1, wherein said relay optic optical components includes a mirror disposed to reflect the images along the optical path in the direction of said intermediate image focal plane.

10. The helmet mounted apparatus of claim 1, wherein the length of the optical path from said entrance pupil to said focal plane is in the range of 100–400 millimeters.

11. The helmet mounted apparatus of claim 1, wherein said relay optic optical components are comprised of a lightweight glass material.

12. The helmet mounted apparatus of claim 1, wherein said relay optic optical components are comprised of a lightweight plastic material.

13. Head mounted apparatus for use in a display system, comprising:
   helmet means, adapted to permit attachment of optical components, having an opening in proximity to the eyes of the observer;
   image source means, adapted to be mounted to said helmet means, for providing an image; the average brightness of said image source means being variable over a substantial range of luminance values; and
   optic means, adapted to be mounted to said helmet means, for presenting a virtual image of said image source means at a focus of from one meter to infinity in the observer's visual field, said optic means comprising relay segment optic means and two separate interchangeable optical eyepiece segment means, each said eyepiece means comprising an arrangement of optical components, said relay optic means comprising an arrangement of optical components common for usage with each said eyepiece means, each said eyepiece means being adapted to releasably engage said relay optic means.

14. The apparatus of claim 13, wherein said relay optic means comprises means for forming an intermediate real image of said image source means at a distance of up to 400 millimeters from said image source means, said intermediate real image having a magnification of from 0.5 to 4.0.

15. The apparatus of claim 14, wherein each said eyepiece means comprises means for presenting a virtual image of said intermediate real image at a focus of from one meter to infinity in the observer's forward visual field.

16. The apparatus of claim 15, wherein the optical path length of said arrangement of relay segment optical components together with said arrangement of optical components comprising either of said eyepiece means ranges up to a maximum of 400 millimeters.

17. The apparatus of claim 16, wherein a first one of said arrangements of optical components comprising a corresponding one of said eyepiece means is catadioptric, said catadioptric eyepiece comprising partially reflective, partially transmissive optical components for superimposing said virtual image in the observer's view of the external scene, said virtual image occupying a portion of the observer's visual field having a minimum subtense of 10 degrees at the observer's eye, whereby said catadioptric eyepiece is optimized for daytime luminance conditions.

18. The apparatus of claim 17, wherein said catadioptric eyepiece comprises a partially transmissive, partially reflective plane beamsplitter disposed in front of the observer's eye, and a second partially transmissive, partially reflective curved combiner optical component disposed in front of said plane beamsplitter along the observer's line of sight.

19. The apparatus of claim 18, wherein a surface of said combiner nearest to the observer's eye is coated with a partially reflective, partially transmissive optical coating having reflectivity in the range of 20–60 percent for visible light in the wavelength range of 400–700 nanometers.

20. The apparatus of claim 19, wherein a surface of said plane beamsplitter farthest from the observer's eye is coated with a partially reflective, partially transmissive optical coating having reflectivity in the range of 20–60 percent for visible light in the wavelength range of 400–700 nanometers.

21. The apparatus of claim 20, wherein a secondary surface of each of said plane beamsplitter and said combiner is coated with an antireflective optical coating for visible light in the wavelength range of 400–700 nanometers, whereby said antireflective coating reduces spurious reflections of visible light in the wavelength range of 400–700 nanometers.

22. The apparatus of claim 18, wherein said combiner comprises a lightweight glass material such as fused silica.

23. The apparatus of claim 18, wherein said plane beamsplitter comprises a lightweight glass material such as fused silica.

24. The apparatus of claim 18, wherein said combiner comprises optical plastic material such as polycarbonate or acrylic.

25. The apparatus of claim 18, wherein said plane beamsplitter comprises optical plastic material such as polycarbonate or acrylic.

26. The apparatus of claim 18, wherein said image source means includes an output image surface, said relay optic means optical components including a plurality of lenses and a plane folding mirror, said catadioptric eyepiece optical components including at least one field lens, said catadioptric eyepiece optical components together with said output image surface and said relay optic means optical components having the following optical prescription characteristics and inter-component spacing:

| Component Type | Surface No. | Radius (mm) | Curve Type | Thick/Dist (mm) | Mat'l |
| --- | --- | --- | --- | --- | --- |
| Image Source | 84 | 40.000000 | CV | 61.863200 | AIR |
| Lens | 85 | 35.488000 | CX | 3.000000 | F4 |
| " | 86 | 21.770000 | CV | 1.792300 | AIR |
| Lens | 87 | 33.991000 | CX | 6.000000 | SIO2 |
| " | 88 | 85.875000 | CX | 21.905600 | AIR |

-continued

| Component Type | Surface No. | Radius (mm) | Curve Type | Thick/Dist (mm) | Mat'l |
|---|---|---|---|---|---|
| Lens | 89 | 201.985000 | CV | 5.500000 | SIO2 |
| " | 90 | 24.617000 | CX | 5.209200 | AIR |
| Lens | 91 | 175.000000 | CX | 4.500000 | SIO2 |
| " | 92 | 54.941000 | CX | 1.433000 | AIR |
| Lens | 93 | 30.044000 | CV | 3.000000 | F4 |
| " | 94 | 384.855000 | CX | 34.294000 | AIR |
| Mirror | 95 | — | — | 19.000000 | AIR |
| Lens | 96 | 221.803000 | CV | 5.000000 | SIO2 |
| " | 97 | 74.673000 | CX | 81.356900 | AIR |
| Lens | 98 | 2000.000000 | CX | 5.000000 | ACRYL |
| " | 99 | 221.803000 | CV | 33.643100 | AIR |
| Beamsplitter | 100 | — | — | 34.801353 | AIR |
| Combiner | 101 | 128.165000 | CV | 35.941353 | AIR |
| Beamsplitter | 100 | — | — | 3.000000 | ACRYL |
| " | 102 | — | — | 51.420000 | AIR |
| " | 103 | — | — | — | — |

27. The apparatus of claim 18, wherein said image source means includes an output image surface, said relay optic means optical components including a plurality of lenses and a plane folding mirror, said catadioptric eyepiece optical components including at least one field lens, said catadioptric eyepiece optical components together with said output image surface and said relay optic means optical components having the following optical prescription characteristics and inter-component spacing:

| Component Type | Surface No. | Radius (mm) | Curve Type | Thick/Dist (mm) | Mat'l |
|---|---|---|---|---|---|
| Image Source | 84 | 40.000000 | CV | 42.360000 | AIR |
| Lens | 130 | 149.880000 | CX | 3.000000 | POLYC |
| " | 131 | 53.660000 | CV | 18.418400 | AIR |
| Lens | 132 | 110.449000 | CX | 7.000000 | ACRYL |
| " | 133 | 57.279000 | CX | 21.000000 | AIR |
| Mirror | 134 | — | — | 43.000000 | AIR |
| Lens | 135 | 316.793000 | CX | 4.000000 | ACRYL |
| " | 136 | 316.793000 | CX | 69.000000 | AIR |
| Lens | 137 | 163.725000 | CX | 7.000000 | ACRYL |
| " | 138 | 42.692000 | CX | 0.000000 | AIR |
| Lens | 139 | 42.692000 | CV | 2.000000 | POLYC |
| " | 140 | 135.158000 | CX | 130.000000 | AIR |
| Mirror | 141 | — | — | 76.000000 | AIR |
| Lens | 142 | 65.596000 | CV | 4.200000 | ACRYL |
| " | 143 | 55.139000 | CX | 64.000000 | AIR |
| Beamsplitter | 144 | — | — | 25.300000 | AIR |
| Combiner | 145 | 135.158000 | CV | 26.500000 | AIR |
| Beamsplitter | 144 | — | — | 3.000000 | ACRYL |
| " | 146 | — | — | 47.000000 | AIR |
| " | 103 | — | — | — | — |

28. The apparatus of claim 17, wherein the effective focal length of said relay optic means optical components together with said catadioptric eyepiece optical components is the range of 15-55 millimeters.

29. The apparatus of claim 16, wherein a second one of said arrangements of opitcal components comprising a corresponding one of said eyepiece means is refractive, said refractive eyepiece comprising a totally reflective plane mirror disposed in front of the observer's eye in the observer's line of sight and at least one lens disposed between the observer's eye and said plane mirror, said plane mirror and said lens disposed to present said intermediate real image into the observer's visual field, said intermediate real image occupying a portion of the observer's visual field having a minimum subtense of 20 degrees at the observer's eye, whereby said refractive eyepiece is optimized for nighttime luminance conditions.

30. The apparatus of claim 29, wherein the effective focal length of said relay optic means optical components together with said refractive eyepiece optical components is in the range of 15-55 millimeters.

31. The apparatus of claim 29, wherein said image source means includes an output image surface, said relay optic means optical components including a plurality of lenses and a plane folding mirror, said refractive eyepiece optical components including at least one eyepiece lens, said refractive eyepiece optical components together with said output image surface and said relay optic means optical components having the following optical prescription characteristics and inter-component spacing:

| Component Type | Surface No. | Radius (mm) | Curve Type | Thick/Dist (mm) | Mat'l |
|---|---|---|---|---|---|
| Image Source | 84 | 40.000000 | CV | 61.863200 | AIR |
| Lens | 85 | 35.488000 | CX | 3.000000 | F4 |
| " | 86 | 21.770000 | CV | 1.792300 | AIR |
| Lens | 87 | 33.991000 | CX | 6.000000 | SIO2 |
| " | 88 | 85.875000 | CX | 21.905600 | AIR |
| Lens | 89 | 201.985000 | CV | 5.500000 | SIO2 |
| " | 90 | 24.617000 | CX | 5.209200 | AIR |
| Lens | 91 | 175.000000 | CX | 4.500000 | SIO2 |
| " | 92 | 54.941000 | CX | 1.433000 | AIR |
| Lens | 93 | 30.044000 | CV | 3.000000 | F4 |
| " | 94 | 384.855000 | CX | 34.294000 | AIR |
| Mirror | 95 | — | — | 19.000000 | AIR |
| Lens | 96 | 221.803000 | CV | 5.000000 | SIO2 |
| " | 97 | 74.673000 | CX | 93.000000 | AIR |
| Lens | 112 | 1863.457201 | CX | 7.000000 | ACRYL |
| " | 113 | 39.515000 | CX | 21.000000 | AIR |
| Mirror | 114 | — | — | 20.500000 | AIR |
| Lens | 115 | — | — | 4.000000 | ACRYL |
| " | 116 | 83.478000 | CX | 0.500000 | AIR |
| Lens | 117 | 39.515000 | CX | 4.500000 | ACRYL |
| " | 118 | — | — | 25.000000 | AIR |
| " | 103 | — | — | — | — |

32. The apparatus of claim 29, wherein said image source means includes an output image surface, said relay optic means optical components including a plurality of lenses and a plane folding mirror, said refractive eyepiece optical components including at least one eyepiece lens, said refractive eyepiece optical components together with said output image surface and said relay optic means optical components having the following optical prescription characteristics and inter-component spacing:

| Component Type | Surface No. | Radius (mm) | Curve Type | Thick/Dist (mm) | Mat'l |
|---|---|---|---|---|---|
| Image Source | 84 | 40.000000 | CV | 42.360000 | AIR |
| Lens | 130 | 149.880000 | CX | 3.000000 | POLYC |
| " | 131 | 53.660000 | CV | 18.418400 | AIR |
| Lens | 132 | 110.449000 | CX | 7.000000 | ACRYL |
| " | 133 | 57.279000 | CX | 21.000000 | AIR |
| Mirror | 134 | — | — | 43.000000 | AIR |
| Lens | 135 | 316.793000 | CX | 4.000000 | ACRYL |
| " | 136 | 316.793000 | CX | 69.000000 | AIR |
| Lens | 137 | 163.725000 | CX | 7.000000 | ACRYL |
| " | 138 | 42.692000 | CX | 0.000000 | AIR |
| Lens | 139 | 42.692000 | CV | 2.000000 | POLYC |
| " | 140 | 135.158000 | CX | 130.000000 | AIR |
| Mirror | 141 | — | — | 114.000000 | AIR |
| Lens | 173 | 84.312000 | CX | 8.000000 | POLYC |
| " | 174 | 84.312000 | CX | 23.000000 | AIR |

-continued

| Component Type | Surface No. | Radius (mm) | Curve Type | Thick/ Dist (mm) | Mat'l |
| --- | --- | --- | --- | --- | --- |
| Mirror | 175 | — | — | 21.000000 | AIR |
| Lens | 176 | 34.836000 | CX | 5.000000 | ACRYL |
| " | 177 | — | — | 24.000000 | AIR |
|  | 103 | — | — | — | — |

33. The apparatus of claim 13, wherein said image source means comprises a miniature cathode ray tube having an active image diameter in the range of 16–25 millimeters.

34. The apparatus of claim 13, wherein said optical components comprising said relay optic means are comprised of different optical materials so as to control chromatic aberrations of visible light.

35. The apparatus of claim 34, wherein said different optical materials include fused silica glass and F4 glass.

36. The apparatus of claim 34, wherein said different optical materials include acrylic and polycarbonate.

37. The apparatus of claim 13, wherein said optical components comprising said relay optic means are disposed so as to allow said optic means to conform to the contour of said helmet means.

38. The apparatus of claim 13, wherein said optical components comprising said relay optic means are mounted in a modular assembly, said modular assembly being attached to an outer surface of said helmet means.

39. The apparatus of claim 13, wherein said optical components comprising each said eyepiece means are mounted in a goggle assembly, said goggle assembly disposed to releasably engage said relay optic means.

* * * * *